United States Patent [19]

Schwander et al.

[11] 4,180,665
[45] Dec. 25, 1979

[54] SUBSTITUTED 3-BENZ(CD)INDOL-2-(1H)-YLIDENE-FURO[2,3-B]QUINOXALIN-2(3H)ONE DYESTUFFS

[75] Inventors: Hansrudolf Schwander, Riehen; Christian Zickendraht, Binningen, both of Switzerland

[73] Assignee: Ciba-Geigy Aktiengesellschaft, Basel, Switzerland

[21] Appl. No.: 796,588

[22] Filed: May 13, 1977

[30] Foreign Application Priority Data

Jun. 1, 1976 [CH] Switzerland ............... 6861/76

[51] Int. Cl.$^2$ ............... C09B 17/00; C09B 57/00; D06P 3/24; D06P 3/52
[52] U.S. Cl. ............... 544/345
[58] Field of Search ............... 260/250 Q; 544/345

[56] References Cited

U.S. PATENT DOCUMENTS

| | | | |
|---|---|---|---|
| 1,762,021 | 6/1930 | Kranzlein et al. | 260/250 Q |
| 3,399,191 | 8/1968 | Brack | 260/250 Q X |
| 3,979,386 | 9/1976 | Von Der Crone et al. | 260/250 Q X |
| 4,020,068 | 4/1977 | Farber | 260/250 Q |
| 4,056,528 | 11/1977 | Schwander et al. | 260/250 Q |

OTHER PUBLICATIONS

Klicnar et al., Chemical Abstracts, vol. 74, #76393d (1971).

Schwander, Chemical Abstracts, vol. 85, #194094g (1976).

*Primary Examiner*—Floyd D. Higel
*Attorney, Agent, or Firm*—Sprung, Felfe, Horn, Lynch & Kramer

[57] ABSTRACT

Dyestuffs of the formula (I)

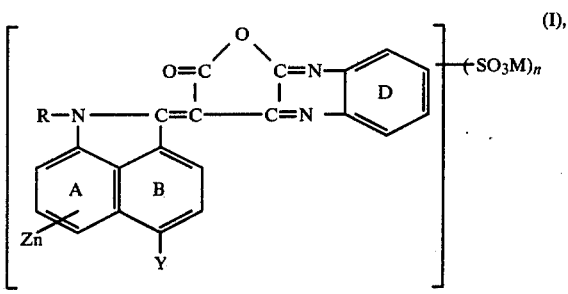

in which R represents alkyl, alkenyl, cycloalkyl, aralkyl, aryl or, preferably, hydrogen, M represents hydrogen or a cation, Y represents a free or modified carboxyl group, Z represents a non-ionic substituent and n represents 0, 1 or 2 and A, B and D can carry further non-ionic substituents are disclosed; the sulfo-free dyestuffs are suitable for dyeing semi-synthetic and synthetic fibers, especially polyamides and polyesters, and the sulfo-substituted dyestuffs are suitable for dyeing, for example, wool and synthetic polyamides.

11 Claims, No Drawings

SUBSTITUTED 3-BENZ(CD)INDOL-2-(1H)-YLIDENE-FURO[2,3-b]QUINOXALIN-2(3H)ONE DYESTUFFS

The present invention relates to dyestuffs of the formula (I)

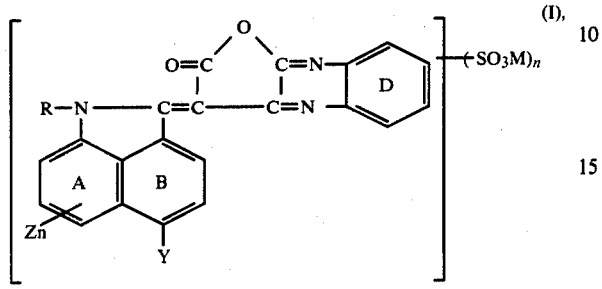

in which R represents alkyl, alkenyl, cycloalkyl, aralkyl, aryl or, preferably, hydrogen, M represents hydrogen or a cation, Y represents a free or modified carboxyl group, Z represents a non-ionic substituent and n represents 0, 1 or 2 and A, B and D can carry further non-ionic substituents.

More specifically, the invention relates to dyestuffs of the formula (I)

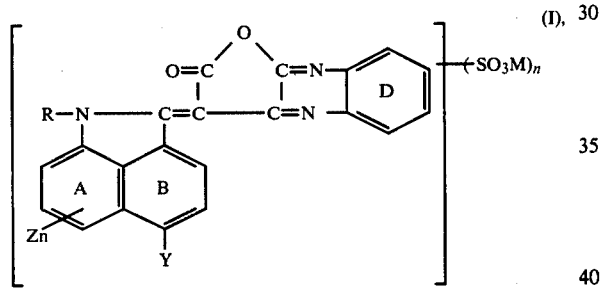

in which R represents $C_1$–$C_5$-alkyl, $C_1$–$C_5$-alkenyl, $C_5$–$C_6$-cycloalkyl, $C_6$–$C_9$-aralkyl, $C_6$–$C_9$-aryl or hydrogen, M represents hydrogen or a cation, Y represents —COOH, —CN, —COCl, —CONR$_1$R$_2$ or —COOR$_2$ wherein R$_1$ and R$_2$ are independently $C_1$–$C_{18}$ alkyl which is unsubstituted or substituted by $C_1$–$C_4$-alkoxy, hydroxy, chloro, bromo, cyano, carboxy, carbo-$C_1$–$C_4$-alkoxy, sulfo, carboxamido or acetoxy; cyclopentyl, methyl cyclohexyl, trimethylcyclohexyl or cyclohexyl; or phenyl, benzyl or phenethyl, which are unsubstituted or substituted by $C_1$–$C_4$-alkyl, $C_1$–$C_4$-alkoxy or halo; and R$_1$ also represents hydrogen, Z is $C_1$–$C_4$-alkyl, $C_1$–$C_4$-alkoxy, Cl, Br, NO$_2$, phenylsulphonyl, $C_1$–$C_4$-alkyl-S-, $C_1$–$C_4$-alkylsulphonyl, cyano, CONH$_2$, CONH-$C_1$–$C_4$-alkyl, and CON($C_1$–$C_4$-alkyl) and n represents 0, 1 or 2 and rings A, B and D are unsubstituted or rings A and B are independently substituted by $C_1$–$C_4$-alkyl, $C_1$–$C_4$-alkoxy, halo, nitro, $C_1$–$C_4$-alkylmercapto, $C_1$–$C_4$-alkylsulphonyl, phenylsulphonyl, benzylsulphonyl, $C_1$–$C_4$-alkylcarbonylamino, $C_1$–$C_4$-alkylsulphonylamino, carboxamido which is unsubstituted or substituted by 1 or 2 $C_1$–$C_4$-alkyl groups, sulphonamido which is unsubstituted or substituted by 1 or 2 $C_1$–$C_4$-alkyl groups, cyano β-hydroxyethyl mercapto, β-hydroxyethylsulphonyl; and ring D is substituted by $C_1$–$C_4$-alkyl, $C_1$–$C_4$-alkoxy, halo, cyano, carbo-$C_1$–$C_4$-alkoxy, cyclohexyl, phenyl-$C_1$–$C_3$-alkyl, phenyl, $C_1$–$C_4$-alkylsulphonyl, phenylsulphonyl and sulphonamido which is unsubstituted or substituted by 1 or 2 $C_1$–$C_4$-alkyl groups, ethoxy-ethoxy or acetyloxyethoxy.

The new dyestuffs according to the invention are obtained when a naphtholactam of the formula II

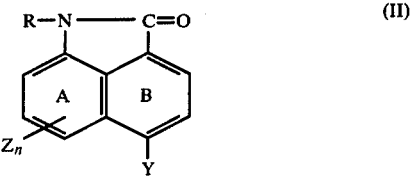

is reacted, with heating, with a substituted acetate of the formula III

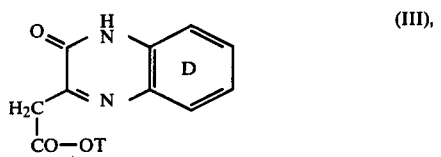

which contains an active methylene group, in the presence of an acid condensing agent, such as phosphorus oxychloride and the reaction product is optionally subsequently sulphonated; in the formulae, A, B, D, R, Z, n and Y have the same meaning as above and T is the radical of a phenol or alcohol which has been freed from the hydroxyl group.

Examples of non-ionic substituents on the rings A and B are alkyl, alkoxy, halogen, nitro, alkylmercapto, alkylsulphonyl, arylsulphonyl, acylamino, cyano, carboxamide and sulphonamide, and alkyl is to be understood, in particular, as alkyl with 1 to 4 carbon atoms, such as methyl, ethyl, isopropyl and n-butyl, alkoxy groups are to be understood, in particular, as those with 1 to 4 carbon atoms, such as methoxy, ethoxy, n-propoxy, n-butoxy and isopropoxy, halogen radicals are to be understood as, in particular, chlorine and bromine, in addition to fluorine, alkylmercapto and alkylsulphonyl are to be understood, in particular, as those which have 1 to 4 carbon atoms in the alkyl radical, such as methylmercapto, β-hydroxyethylmercapto, isopropylmercapto or n-butylmercapto or methylsulphonyl, β-hydroxyethylsulphonyl, isopropylsulphonyl or n-butylsulphonyl, arylsulphonyl is to be understood, in particular, as phenylsulphonyl, aralkylsulphonyl is to be understood as, preferably, benzylsulphonyl, acylamino is to be understood, in particular, as $C_1$–$C_4$-alkylcarbonylamino, such as acetylamino, and $C_1$–$C_4$-alkylsulphonylamino, such as methylsulphonylamino, and carboxamide and sulphonamide radicals are to be understood, in particular, as carboxamide or sulphonamide radicals which are substituted by one or two alkyl radicals which contain 1 to 4 carbon atoms, such as methyl, ethyl or n-butyl.

Examples of non-ionic substituents on ring D which may be mentioned are: alkyl, alkoxy, alkylmercapto, halogen, cyano, carboalkoxy, cycloalkyl, aralkyl, aryloxy, arylmercapto, phenyl, alkylsulphonyl, phenylsulphonyl and sulphonamide, and alkyl is to be understood, in particular, as alkyl with 1 to 4 carbon atoms, such as methyl, ethyl, β-cyanoethyl, n-propyl, isopropyl and n-butyl radicals, as well as trifluoromethyl groups, and possible alkoxy, halogen, alkylsulphonyl and sulphonamide groups are, in particular, those which have been mentioned as being suitable for rings A and B and cycloalkyl is to be understood, in particular, as the cyclohexyl radical and aralkyl is to be understood, in particular, as phenyl-$C_1$-$C_3$-alkylene radicals.

Preferred dyestuffs are those of the formula

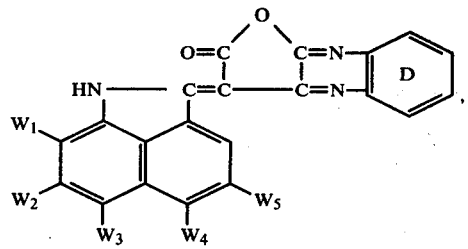

in which D has the same meaning as above and $W_1$ denotes hydrogen, chlorine, bromine, alkyl, alkoxy, nitro or arylmercapto, $W_2$ denotes hydrogen or chlorine, $W_3$ denotes hydrogen, chlorine, bromine, alkyl, alkoxy, nitro, acylamino, alkylsulphonylamino, arylsulphonylamino, alkylmercapto, arylmercapto, arylsulphonyl, alkylsulphonyl, optionally N-substituted sulphonamide, alkanoyl or aroyl, $W_4$ denotes the COOH group and its modified radicals and $W_5$ denotes hydrogen, chlorine or alkoxy.

$W_1$ is, for example, methyl, ethyl, methoxy, ethoxy, phenylmercapto or phenylmercapto which is substituted by chlorine, methyl, methoxy, phenyl, phenoxy or methoxycarbonyl.

Radicals to be mentioned for $W_3$ are the same radicals as for $W_1$ as well as naphthylmercapto, acetylaminophenylmercapto, acetylamino, propionylamino, benzoylamino, benzoylamino which is substituted by chlorine, bromine, methyl or methoxy, methylsulphonylamino, ethylsulphonylamino, phenylsulphonylamino, tolylsulphonylamino, methylmercapto, ethylmercapto, β-hydroxyethylmercapto, methylsulphonyl, ethylsulphonyl, phenylsulphonyl, tolylsulphonyl, chlorophenylsulphonyl, acetyl, propionyl, butyryl, benzoyl, benzoyl which is substituted by methyl, methoxy, chlorine or bromine, sulphamoyl, N-methyl-, N-ethyl-, N-butyl-, N-phenyl-, N-chlorophenyl-, N-methylphenyl-, N-methyoxyphenyl-, N-trifluoromethylphenyl-, N-methyl-N-phenyl-, N,N-dimethyl-, N,N-diethyl-, N,N-dipropyl- or N,N-dibutyl-sulphamoyl, pyrrolidinosulphonyl, piperidinosulphonyl or morpholinosulphonyl. The radicals of the formulae $NHCONH_2$, $NHCONHCH_3$ or $NHCONHC_6H_5$ are also possible.

Radicals $W_4$ are the group —COOH and its functional derivatives. Alkoxy radicals $W_5$ are, for example, methoxy or ethoxy.

More specifically, these dyestuffs are of the formula

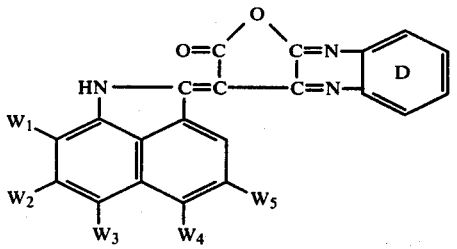

in which D has the same meaning as above and $W_1$ denotes hydrogen, chlorine, bromine, $C_1$-$C_4$-alkyl, $C_1$-$C_4$-alkoxy, nitro or $C_6$-$C_9$-arylmercapto, $W_2$ denotes hydrogen or chlorine, $W_3$ denotes hydrogen, chlorine, bromine, $C_1$-$C_5$-alkyl, $C_1$-$C_5$-alkoxy, nitro, $C_1$-$C_5$-alkylcarbonylamino, $C_1$-$C_4$-alkylsulphonylamino, phenyl sulphonylamino, $C_1$-$C_4$-alkylmercapto, phenyl mercapto, phenyl sulphonyl, $C_1$-$C_5$-alkylsulphonyl, $SO_2NH_2$, $SO_2NH$-$C_1$-$C_4$-alkyl, $SO_2N$($C_1$-$C_4$-alkyl)$_2$, $C_1$-$C_5$-alkanoyl or $C_7$-$C_{10}$-aroyl, $W_4$ denotes —COOH, —CN, —COCl, —CONR$_1$R$_2$ or —COOR$_2$ wherein $R_1$ and $R_2$ are independently $C_1$-$C_{18}$-alkyl which is unsubstituted or substituted by $C_1$-$C_4$-alkoxy, hydroxy, chloro, bromo, cyano, carboxy, carbo-$C_1$-$C_4$-alkoxy, sulfo, carboxamido or acetoxy; cyclopentyl, methyl cyclohexyl, trimethylcyclohexyl, or cyclohexyl; or phenyl, benzyl or phenethyl, which are unsubstituted or substituted by $C_1$-$C_4$-alkyl, $C_1$-$C_4$-alkoxy or halo; and $R_1$ also represents hydrogen and $W_5$ denotes hydrogen, chlorine or $C_1$-$C_4$-alkoxy.

The dyestuffs of the formula

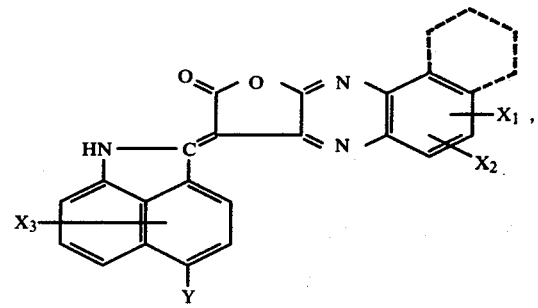

in which $X_1$ can represent hydrogen, alkyl (substituted or unsubstituted), alkoxy (substituted or unsubstituted), phenoxy (substituted or unsubstituted), thiophenoxy (substituted or unsubstituted), S-alkyl (substituted or unsubstituted), halogen (preferably bromine or chlorine), COOR (R=alkyl [substituted or unsubstituted]),

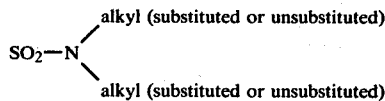

—$SO_2$-alkyl or CN, $X_2$ represents methoxy, ethoxy, methyl or, preferably hydrogen, $X_3$ represents hydrogen, alkyl (with preferably up to 4 carbon atoms), alkoxy (with preferably 1 to 4 C atoms),

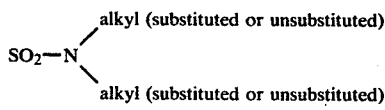

nitro, bromine, chlorine or $SO_2$-R (R=alkyl or phenyl [substituted or unsubstituted]), H, Br and Cl being preferred, Y has the same meaning as above and the ring indicated by a broken line optionally represents a fused benzo radical, are also preferred.

Particularly preferentially, Y represents —CN, —COCl, —CO—Q' or, preferably —CO—OR'$_1$, in which Q' is the radical of an amine H—Q' and R'$_1$ is optionally substituted alkyl, alkenyl, cycloalkyl, aralkyl or aryl or a heterocyclic radical.

In the carboxamide groups —CO—Q and —CO—Q′, the radicals Q and Q′, of the amines QH and Q′H, independently of one another denote methylamino, ethylamino, dimethylamino, diethylamino, dipropylamino, di-n-butylamino, N-methyl-N-butylamino, N-(2-hydroxy-, 2-chloro-, 2-methoxy-, 2-bromo- or 2-cyanoethyl)-amino, N,N-di-(2-hydroxy-, 2-chloro-, 2-methoxy- or 2-cyanoethyl)-amino, N-2-cyanoethyl-N-ethylamino, N-2-cyanoethyl-N-2-hydroxyethylamino, N-2-lower alkoxy (for example $C_1$–$C_4$-alkoxy)-N-lower alkyl (for example $C_1$–$C_4$-alkyl-, especially methyl)-amino, N-methoxyethyl-N-cyanoethylamino, N-methyl-N-ethylamino, N-2-methylthioethylamino, N-2-methylsulphonylethylamino, γ-methoxypropylamino, γ-cyanopropylamino, γ-carboxypropylamino, γ-sulphopropylamino, radicals of the formula (lower alkyl)$_2$N(CH$_2$)$_{1-4}$—NH—, such as dimethylaminoethylamino or dibutylaminoethylamino, radicals of the formula (N-morpholinyl-, N-pyrrolidinyl- or N-piperidinyl-)-(CH$_2$)$_{1-4}$—NH—, N-hydroxyethyl-N-cyclohexylamino, 3-hydroxy-1,1-dimethylpropylamino, benzylamino, o-, m- or p-nitrobenzylamino, o-, m- or p-methylbenzylamino, o-, m- or p-methoxybenzylamino, phenylethylamino, cyclohexylamino, methylcyclohexylamino, 2,2,5-trimethylcyclohexylamino, dicyclohexylamino, tetramethylenesulphonyl-3-amino, N-pyrrolidinyl, N-piperidinyl, N-morpholinyl, N-4-sulphapiperidinyl (N-thiomorpholinyl),

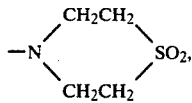

N-(N′-lower alkyl (for example methyl))-piperazinyl, N-(N′-lower alkylcarbonyl (for example acetyl))-piperazinyl, N-(N′-hydroxyethyl)-piperazinyl, phenylamino, o- p- or m-chlorophenylamino, 3,6-dichlorophenylamino, o-, m- or p-bromophenylamino, o- or p-fluorophenylamino, m-trifluoromethylphenylamino, m- or p-nitrophenylamino, o-, m- or p-methylphenylamino, o-, m- or p-lower alkoxyphenylamino, such as o-, m- or p-methoxyphenylamino, m- or p-carboxyphenylamino, m- or p-carboxamidophenylamino, m- or p-acetamidophenylamino, p- or m-aminosulphonylphenylamino, m-bis-(hydroxyethylamino)-sulphonylphenylamino, methylsulphonylphenylamino, p-(2-hydroxyethyl)-sulphonylphenylamino, N-cyclohexyl-N-phenylamino, N-methyl-N-phenylamino, N-phenyl-N-2-hydroxyethylamino, N-phenyl-N-2-cyanoethylamino, N-p-chlorophenyl-N-2-hydroxyethylamino, p-phenoxyphenylamino, p-(p′-chlorophenoxy)-phenylamino, p′-methylphenoxyphenylamino, m-chloro-o-phenoxyphenylamino, p-benzylphenylamino and p-acetamidophenylamino and p-propionylamidophenylamino, amino radicals of the formula

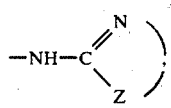

in which Z has the same meaning as above, such as, for example, thiazolyl-2-amino, benzthiazolyl-2-amino, benzoxazolyl-2-amino, 1,3,4-triazolyl-2-amino, 1-thia-3,4-diazolyl-2-amino and benzimidazolyl-2-amino and their methoxy, ethoxy, phenyl, chlorine, bromine, methyl, ethyl, carbomethoxy and carboethoxy derivatives, α- and β-tetrahydrofurfurylamino, 2-furfurylamino, N-α- and -β-tetrahydrofurfuryl-N-methylamino, thiophenyl-2-amino and pyridyl-3-amino, and the amino radicals derived from sulphanilic acid and taurine.

Preferably, the amines HQ and HQ′ are so chosen that the radicals Q and Q′ represent the groups of the formulae NHR′$_1$ and NR′$_1$R′$_2$, in which R′$_1$ and R′$_2$ are optionally substituted aralkyl radicals and, if R′$_1$ is an optionally substituted lower alkyl radical, R′$_2$ can also be an optionally substituted aryl radical and, if R′$_1$ is a hydrogen atom, R′$_2$ can be an optionally substituted alkyl radical, an optionally substituted aralkyl radical or an optionally substituted aryl radical.

Radicals R are, in addition to hydrogen, in particular alkyl with 1 to 8 carbon atoms, hydroxyalkyl with 2 or 3 carbon atoms, alkoxyalkyl with 3 to 8 carbon atoms, β-chloroethyl, β-cyanoethyl, alkoxycarbonylethyl with 1 to 4 carbon atoms in the alkoxy, carbamoylethyl, N-monosubstituted or N,N-disubstituted alkylcarbamoylethyl with 1 to 4 carbon atoms in the alkyl, cyclohexyl, benzyl, phenylethyl or phenyl and also alkenyl.

Examples which may be mentioned individually are: propyl, butyl, hexyl, β-ethylhexyl, β-hydroxyethyl or β-hydroxypropyl, methoxyethyl, ethoxyethyl, methoxypropyl, ethoxypropyl, butoxypropyl, amyloxypropyl, methoxycarbonylethyl, ethoxycarbonylethyl, allyl or butoxycarbonylethyl and, preferably, methyl, ethyl or β-cyanoethyl.

Individual meanings which are possible for the groups $R_1$, $R_2$, $R'_1$ and $R'_2$ are, for example, the following: $C_1$–$C_{18}$-alkyl groups, which are optionally substituted by $C_1$–$C_4$-alkoxy, hydroxyl, chlorine, bromine, cyano, carboxyl, carb-$C_1$–$C_4$-alkoxy, sulpho, carboxamide or acetoxy; examples which may be mentioned are methyl, butyl, propyl, ethyl, octyl, β-cyanoethyl, β-chloroethyl, β-hydroxyethyl, β-hydroxypropyl, β-hydroxy-γ-chloropropyl, β-carboxyethyl, β-carbomethoxyethyl, β-carboethoxyethyl or β-carbobutoxyethyl, β-carboxamidoethyl and β-acetoxyethyl; as well as cycloaliphatic groups, such as cyclopentyl, methylcyclohexyl, trimethylcyclohexyl and, preferably, cyclohexyl; or phenyl, benzyl or phenethyl which are optionally substituted by $C_1$–$C_4$-alkyl, such as methyl, lower alkoxy, such as methoxy, or halogen, such as chlorine.

Possible cations M are those of inorganic or organic bases, possible inorganic cations being, in particular, alkali metal cations, such as Na, K and Li, and ammonium, and possible organic cations being, for example, pyridinium, alkyl-ammonium and dialkyl-ammonium, in which the alkyl groups preferably have 1 to 4 carbon atoms, as well as cations of basic dyestuffs. Monosulphonated dyestuffs are preferred.

When it is used in connection with definitions, such as alkyl, alkoxy, carbalkoxy and the like, the term "lower" denotes that the alkyl radicals which occur in the radical contain not more than 4 carbon atoms.

Examples of non-ionic substituents on the rings A and B are alkyl, alkoxy, halogen, nitro, alkylmercapto, alkylsulphonyl, arylsulphonyl, acylamino, cyano, carboxamide and sulphonamide, and alkyl is to be understood, in particular, as alkyl with 1 to 4 carbon atoms, such as methyl, ethyl, isopropyl and n-butyl, alkoxy groups are to be understood, in particular, as those with 1 to 4 carbon atoms, such as methoxy, ethoxy, n-propoxy, n-butoxy and isopropoxy, halogen radicals are to be understood as, in particular, chlorine and bromine, in addition to fluorine, alkylmercapto and alkylsulphonyl are to be understood, in particular, as those which have 1 to 4 carbon atoms in the alkyl radical, such as methylmercapto, β-hydroxyethylmercapto, isopropylmercapto or n-butylmercapto or methylsulphonyl, β-hydroxyethylsulphonyl, isopropylsulphonyl or n-butylsulphonyl, arylsulphonyl is to be understood, in particular, as phenylsulphonyl, aralkylsulphonyl is to be understood as, preferably, benzylsulphonyl, acylamino is to be understood as, in particular, $C_1-C_4$-alkylcarbonylamino, such as acetylamino, and $C_1-C_4$-alkylsulphonylamino, such as methylsulphonylamino, and carboxamide and sulphonamide radicals are to be understood, in particular, as carboxamide or sulphonamide radicals which are substituted by one or two alkyl radicals which contain 1 to 4 carbon atoms, such as methyl, ethyl or n-butyl.

The substituted or unsubstituted alkoxy and alkyl groups indicated in the abovementioned groups preferably contain not more than 5 carbon atoms. In the text which follows they are also termed lower alkyl groups and lower alkoxy groups.

The alkyl groups which can arise in the radicals $X_1$, $X_2$ and $X_3$ are optionally substituted by $C_1-C_4$-alkoxy, chlorine, bromine, cyano, carboxyl, carb-$C_1-C_4$-alkoxy, sulpho, carboxamide or acetoxy and are, for example, methyl, ethyl, β-cyanoethyl, β-chloroethyl, β-hydroxyethyl, β-hydroxypropyl, β-hydroxy-γ-chloropropyl, β-carboxyethyl, β-carbomethoxyethyl, β-carboethoxyethyl or β-carbobutoxyethyl, β-carboxamidoethyl or β-acetoxyethyl.

Particularly preferred dyestuffs are those of the formulae

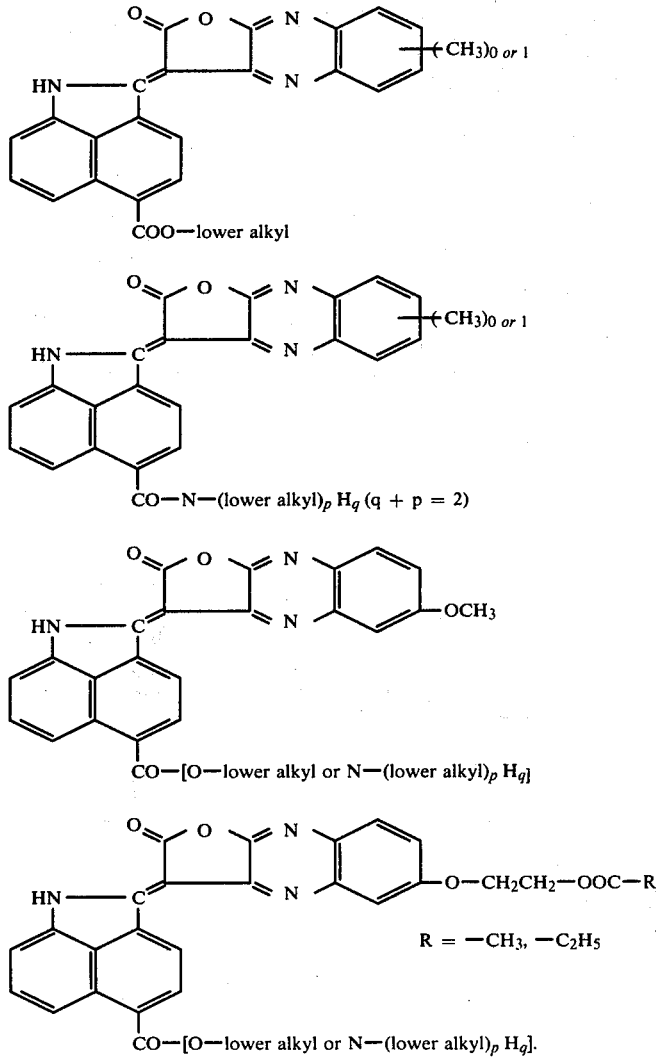

Groups which confer solubility in water are, above all, sulphonic acid groups and groups which have positively charged (quaternary) nitrogen atoms. It is true that free carboxyl groups (—COOH) are as a rule included amongst the groups conferring solubility in water, but these as a rule effect solubility in water only in the form of their salts, for example the alkali metal salts, so that their exclusion merely represents a preferred embodiment.

The reaction of the naphtholacetam of the formula II with the acetate of the formula III which contains an active methylene group is carried out in the presence of an acid condensing agent, such as phosphorus oxybromide, phosphorus trichloride, phosphorus tribromide, phosphorus pentachloride, thionyl chloride, phosgene (in an autoclave) or mixtures of phosphorus oxychloride and phosphorus pentoxide, but especially in the presence of phosphorus oxychloride.

The reaction is advantageously carried out with heating, for example at temperatures of 50° to 200° C., but preferably in a range from 60° to 130° C. It is appropriately carried out in an inert organic solvent such as benzene, toluene, xylene, chlorobenzene, dichlorobenzene, nitrobenzene, ethylene, chloride, carbon tetrachloride or chloroform.

The starting materials of the formula III are obtainable by a condensation reaction of phenylenediamines of the formula

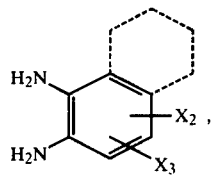

in which $X_2$ and $X_3$ and the ring indicated by a broken line have the same meaning as above, with oxalacetates of the formula $$T_1O\text{—}OC\text{—}CO\text{—}CH_2\text{—}COOT_2,$$

in which $T_1$ and $T_2$ preferably denote lower alkyl groups. The condensation product can be represented by the tautomeric formulae

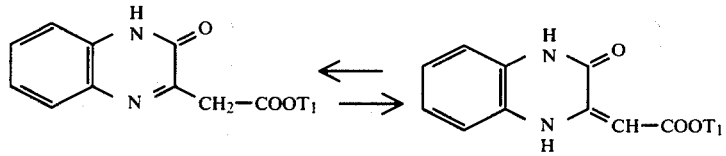

Suitable diamines are o-phenylenediamine, 1,2-diamino-4-methylbenzene, 1,2-diamino-3-methylbenzene, 1,2-diamino-4,6-dimethylbenzene, 1,2-diamino-4-cyanobenzene, 1,2-diamino-4-methoxybenzene, 1,2-diamino-3-methoxybenzene, 1,2-diamino-4-acetylaminobenzene, 1,2-diamino-(3- or 4)-ethoxybenzene, 1,2-diamino-(3- or 4)-propoxybenzene, 1,2-diamino-3- or 4-(1,2-epoxypropoxy)-benzene, 1,2-diamino-4-nitrobenzene, 1,2-diamino-4-chloro-5-ethoxybenzene, 1,2-diamino-naphthalene, 1,2-diamino-4-chlorobenzene, 1,2-diamino-4-bromobenzene, 1,2-diamino-4-N-(ethyl-, β-hydroxyethyl- or β-acyloxyethyl)-benzene or 1,2-diamino-4-N,N-diethylaminobenzene.

Suitable oxalylacetates are, above all, the lower alkyl esters.

The subsequent sulphonation of compounds of the formula I which are free from sulphonic acid groups is appropriately carried out by reacting the compounds with customary sulphonating agents, preferably oleum containing 5 to 60% of SO$_3$, one to two sulpho groups being introduced by this means. The reaction is appropriately carried out at temperatures between 5° and 50° C. by methods which are in themselves known.

A further route to the dyestuffs of the formula I consists in carrying out the condensation reaction with halogen-containing condensing agents, such as, in particular, phosphorus oxychloride, so that a —CO-halogeno group, especially a chlorocarbonyl group, is formed in the 4-position of the naphtholactam and this group is subsequently reacted with alcohols, phenols, amines or mercaptans to give the corresponding esters, amides or thio-esters.

Alcohols and phenols which are suitable for the reaction are, for example, methanol, ethanol, n-propanol, i-propanol, butanol, sec.-butanol, iso-butanol, 1,2-dihydroxybutane, 2,5-dihydroxyhexane, 3-methyl-1,5-dihydroxypentane, 2-ethylhexanol, 2,2-dimethylpentanol, 2,2,4-trimethylpentanol, dodecyl alcohol, octadecyl alcohol, benzyl alcohol, cyclohexanol, allyl alcohol, methallyl alcohol, cinnamyl alcohol, lauryl alcohol, oleyl alcohol, cyclohexanol, tetrahydrofuryl alcohol, diethylene glycol monomethyl ether or monoacetate, triethylene glycol monobutyl ether, ethylene glycol, 1,3-propylene glycol, 1,4-butanediol, 1,5-pentanediol, 1,6-hexanediol, neopentyl glycol, 2,2-diethylpropane-1,3-diol, 2-ethyl-2-butylpropane-1,3-diol, 2-ethyl-2-propylpropane-1,3-diol, 2,2,4-trimethylhexane-1,6-diol, 2-ethyl-2-methylpropane-1,3-diol, 1,10-decanediol, diethylene glycol triethylene glycol, β,β'-thiodiethanol, 1,1-, 1,2-, 1,3- and 1,4-dimethylolcyclohexane and 1,2-, 1,3- and 1,4-α,α'-xylene glycol.

Examples of amino alcohols, which give esters which are possible here, are 2-aminoethanol, 3-aminopropanol, 1-amino-2-propanol, 2-amino-2-methylpropanol, 2-aminobutanol, 3-aminobutanol, 3-amino-2-butanol, 3-amino-3-methyl-2-butanol, 2-methylaminoethanol, 2-dimethylaminoethanol, 2-ethylaminoethanol, 2-diethylaminoethanol, 3-methylaminopropanol, 3-dimethylaminopropanol, 3-ethylaminopropanol, 3-dimethylaminopropanol, 1-methylamino-2-propanol, 1-dimethylamino-2-propanol, 1-ethylamino-2-propanol, 1-diethylamino-2-propanol, 3-methylaminobutanol, 3-dimethylaminobutanol, 3-ethylaminobutanol, 3-diethylaminobutanol, 3-methylamino-2-butanol, 3-dimethylamino-2-butanol, 3-ethylamino-2-butanol, 3-diethylamino-2-butanol, 2-(2-aminoethylamino)-ethanol, N-(2-hydroxyethyl)-piperidine, 2-aminocyclohexanol, 2-methylaminocyclohexanol, 2-dimethylaminocyclohexanol, 2-benzylaminoethanol and α-aminomethylbenzyl alcohol. Phenol and mono- and poly-alkylphenols, for example 2-, 3- or 4-methyl, -ethyl-, -n-propyl-, -isopropyl-, -n-butyl-, -isobutyl-, -tert.-butyl-, -n- or -iso-pentyl-, -n- or -iso-dodecyl-, -n- or -iso-palmityl-, -n- or -iso-stearyl-, -ethane-, -propene-, -butene- and -ethine-phenol, 2,3-, 2,4-, 2,5-, 2,6-, 3,4- or 3,5-dimethyl-, -diethyl- and -dipropyl- phenols, 2,3,4-, 2,3,5-, 2,3,6-, 3,4,5- or 2,4,6-trimethyl-, -triethyl- and -tripropyl-phenols, 2,3,4,6-, 2,3,4,5- or 2,3,5,6-tetramethyl-, -tetraethyl- and -tetrapropyl-phenols and 2,3,4,5,6-pentamethylphenol, it also being possible for the abovementioned alkyl radicals to be mixed, for example, 2,6-dimethyl-4-tert.-butylphenol; cycloalkylphenols, for example 2-, 3- or 4-cyclohexylphenol; substituted alkylphenols, for example 4-chloromethyl-, 4-hydroxymethyl- and 3-trifluoromethylphenol; aralkylphenols, for example 2-, 3- or 4-benzylphenols; arylphenols, for example 2-, 3- or 4-hydroxydiphenyl; alkylamino-, arylamino- and acylamino-phenols, for example 2-, 3- or 4-acetylamino-, 2, 3- or 4-benzoylamino-, 2-, 3- or 4-methacroylamino- and N-methyl-N-formyl-4-aminophenol; halogenophenols, for example 2-, 3- or 4-chloro- or -bromo-phenol, 2,3-, 2,4-, 2,5-, 2,6-, 3,4- or 3,5-dichloro(bromo)-phenol, 2-methyl-5-chloro-, 2-methyl-6-chloro-, 3-methyl-4-chloro-, 5-methyl-2-chloro-, 2-methyl-4-chloro- or 2-methyl-3-chlorophenol and 3,5,3′,5′-tetrachloro-2,2′-dihydroxydiphenyl; nitrophenols, for example 2-, 3- or 4-nitrophenol, 2-methyl-5-nitro-, 4-methyl-2-nitro, 3-methyl-4-nitro-, 4-methyl-3-nitro- and 3,5-dimethyl-4-nitro-phenol; hydroxyphenylsulphonic acids and hydroxyphenylcarboxylic acids and their esters and amides, for example 3- or 4-hydroxybenzoic acid or -benzenesulphonic acid, 2-, 3- or 4-hydroxy-benzoic acid (or -benzenesulphonic acid) methyl ester, propyl ester, isobutyl ester, phenyl ester, naphthyl ester and halogenophenyl esters, 2-hydroxy-5-chlorobenzoic acid ester, 2-cyanato-3-methyl-benzoic acid esters, 2-, 3- or 4-hydroxybenzoic acid dimethylamide, diethylamide, morpholylamide or piperidylamide; alkoxyaryloxy- and acyloxy-phenols, for example 2-, 3- or 4-methoxy-, -ethoxy-, -propoxy-, -isopropoxy-, -butoxy-, -phenoxy-, -acetoxy- and -benzoxy-phenols, N,N-dialkylcarbamate and 4-allyl-2-methoxyphenol; acylphenols, for example 2-, 3- or 4-acetyl-, -propionyl- and -benzoyl-phenol and 4-acetyl-1,3-dihydroxybenzene; cyanophenols, for example 2-, 3- or 4-cyanophenol; phenols with S-containing substituents, for example 2-, 3- or 4-methylmercapto-, -ethylmercapto-, -propylmercapto-, -phenylmercapto-, -acetylmercapto-, and -benzoylmercapto-phenols, 3- or 4-mercapto-phenols, 2,4-bis-methylmercapto-3-methyl-phenol and

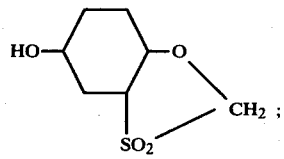

polyhydric phenols, such as, for example pyrocatechol, hydroquinone, resorcinol and the like; alkylated dihydroxyphenols, such as, for example, 1,3-dihydroxy-4-methylbenzene or 1,2-dihydroxy-4-hexylbenzene; alkoxylated dihydroxyphenols, such as, for example, 1,4-dihydroxy-3-hexoxybenzene; cycloaliphatic phenols, such as, for example, p-cyclopentylphenol or p-cyclohexylphenol; halogenated dihydroxyphenols, such as, for example, 1,2-dihydroxy-4-chlorobenzene; trihydric phenols, such as, for example, phloroglucinol or pyrogallol; and polynuclear phenols, such as, for example, 2,2-bis-(p-hydroxyphenyl)-propane, 4,4′-dihydroxydiphenyl, 2,2′-dihydroxydiphenyl, 2,4′-dihydroxydiphenyl and dihydroxynaphthalenes, such as 2,6-dihydroxynaphthalene, can also be used. Dihydroxyarylsulphones, for example bis-(p-hydroxyphenyl)-sulphone, 2,4′-dihydroxydiphenylsulphone, 5′-chloro-2,4-dihydroxydiphenylsulphone, 5′-chloro-2,4′-dihydroxydiphenylsulphone, 3′-chloro-4,4′-dihydroxydiphenylsulphone and bis-(4-hydroxyphenyl)-biphenyldisulphone, can also be used.

Aromatic dihydroxy-ethers, for example p,p′-dihydroxydiphenyl ether, p,p′-dihydroxytriphenyl ether, the 4,3′-, 4,2′-, 3,3′-, 2,2′- and 2,3′-dihydroxydiphenyl ethers and 4,4′-dihydroxy-2,5-dimethyldiphenyl ether, are also suitable, as are the addition products of equimolar amounts of ethylene oxide and mercaptans, and also n-butylmercaptan, phenylmercaptan, 2-, 3- or 4-chlorophenylmercaptan, 2,4- or 2,5-dichlorophenylmercaptan, 2-, 3- or 4-methylphenylmercaptan, 2,4- or 2,5-dimethylphenylmercaptan, 2-, 3- or 4-methoxyphenylmercaptan, 2,4- or 2,5-dimethoxyphenylmercaptan, 2- or 4-nitrophenylmercaptan, 2- or 4-carbomethoxyphenylmercaptan, 2-mercapto-benzthiazole, 2-mercapto-6-chloro-benzthiazole, 2-mercapto-4-chloro-benzthiazole, 2-mercapto-4-methyl-benzthiazole, 2-mercapto-6-methyl-benzthiazole, 2-mercapto-6-methoxy-benzthiazole, 2-mercapto-6-ethoxy-benzthiazole, 2-mercapto-benzoxazole and 2-mercaptobenzimidazole.

Compounds $H_2N—NR_3R_4$ which can be employed, optionally in the form of their salts, such as hydrochlorides, hydrobromides, hydroiodides, nitrates, sulphates or acetates, are, for example the following hydrazines and hydrazides and cyclohexanone hydrazone: asymmetrical dimethylhydrazine, methylhydrazine, isopropylhydrazine, phenylhydrazine, 2-nitrophenylhydrazine, 3-nitrophenylhydrazine, 4-nitrophenylhydrazine, 2,4-dinitrophenylhydrazine, 2-chlorophenylhydrazine, N-aminopiperidine, N-aminopyrrolidine, N-aminomorpholine, N-aminocarbazole, N-aminotetrahydro(iso)quinoline, methanesulphonic acid hydrazide, ethanesulphonic acid hydrazide, isopropanesulphonic acid hydrazide, hexanesulphonic acid hydrazide, cyclohexanesulphonic acid hydrazide, $C_1$-$C_5$-alkanoylhydrazides, such as acetylhydrazide, benzoylhydrazide, benzenesulphonic acid hydrazide, 2-, 3- or 4-toluenesulphonic acid hydrazide, 2-, 3- or 4-chloro-(bromo- or fluoro-)benzenesulphonic acid hydrazide, 2-, 3- or 4-hydroxybenzenesulphonic acid hydrazide, 2-, 3- or 4-dimethylaminobenzenesulphonic acid hydrazide, 2-, 3- or 4-nitrobenzenesulphonic acid hydrazide, 2-, 3- or 4-methylmercapto-benzenesulphonic acid hydrazide, quinolinesulphonic acid hydrazides, carbazolesulphonic acid hydrazides, phenylpyrazolonesulphonic acid hydrazides and imidazolesulphonic acid hydrazides.

The naphtholactam compounds of the formula II which are employed as starting materials, are obtainable by reacting o-xylylene dicyanide with glyoxal in the presence of a base (NaOH or KOH) and a solvent at temperatures below 50° C. (for example 0° to 40° C.) to give 1,4-dicyanonaphthalene and subsequently either (a) saponifying the 1,4-dicyanonaphthalene in a basic or, preferably, acid medium to give the 1,4-dicarboxylic acid and either converting the 1,4-naphthalenedicarboxylic acid into a functional derivative and then converting the latter, using a 10 to 50% excess of nitric acid, to the 8-nitro-1,4-naphthalenedicarboxylic acid derivative and reducing this to the 8-amino derivative, or nitrating the 1,4-naphthalenedicarboxylic acid direct and subsequently reducing the reaction product to the 8-amino-naphthalene-1,4-dicarboxylic acid, and then converting the 8-amino derivative into the 1,8-naphtholactam-4-carboxylic acid, or functional derivative thereof, either by spontaneous cyclisation or by warming, or (b) nitrating the 1,4-dicyanonaphthalene in the 8-position using a 10 to 50% excess of nitric acid and subsequently reducing the nitro group to the 8-amino group, effecting naphtholactam cyclisation by spontaneous formation or by warming and saponifying the cyano group in the 4-position, if this has not already been saponified during the reduction of the 8-nitro group, in a basic or acid medium, optionally via the stage of the 4-carboxamido-1,8-naphtholactam.

The naphtholactams which contain an organic group as the substituent R on the lactam ring are obtained, for example, by alkylating the corresponding naphtholactams which carry hydrogen on the nitrogen atom of the lactam ring (R=H) in a polar aprotic solvent, such as dimethylformamide or N-methylpyrrolidone, with a toluenesulphonic acid ester of the formula

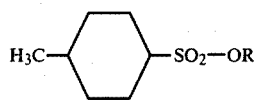

in the presence of a strong base, such as sodium hydroxide or potassium hydroxide. R has the same meaning as above.

The dyestuffs of the formula I give brilliant, luminous violet to red-violet and blue dyeings which usually fluoresce in UV light and have outstanding fastness properties in use, the dyestuffs which are free from groups conferring solubility in water being especially valuable.

The new dyestuffs are preferably free from sulphonic acid groups and are suitable for dyeing semi-synthetic and fully synthetic fibres, such as acrylic fibres or acrylonitrile fibres, polyacrylonitrile fibres and copolymers of acrylonitrile and other vinyl compounds, such as acrylates, acrylamides, vinylpyridine, vinyl chloride or vinylidene chloride, copolymers of dicyanoethylene and vinyl acetate and also acrylonitrile block copolymers, fibres made of polyurethanes, polyolefines, such as base-modified, nickel-modified or unmodified polypropylene, and cellulose triacetate and cellulose 2½-acetate and especially fibres made of polyamides, such as Nylon-6, Nylon-6,6 or Nylon 12, and fibres made of aromatic polyesters, such as those of terephthalic acid and ethylene glycol or 1,4-dimethylolcyclohexane and copolymers of terephthalic acid and isophthalic acid and ethylene glycol.

Dyeing of the said fibre materials with the dyestuffs, which preferably are sparingly soluble in water, is preferably effected from an aqueous dispersion.

It is, therefore, appropriate finely to divide those dyestuffs which can be used as disperse dyestuffs, by grinding with textile auxiliaries, such as, for example, dispersing agents and possibly grinding auxiliaries. Subsequent drying gives dyestuff formulations which consist of the textile auxiliary and the dyestuff.

Examples which may be mentioned of dispersing agents, of the non-ionic group, which can advantageously be used are: addition products of 8 mols of ethylene oxide with 1 mol of p-tert.-octylphenol, of 15 or 6 mols of ethylene oxide with castor oil and of 20 mols of ethylene oxide with the alcohol $C_{16}H_{33}OH$, addition products of ethylene oxide with di-[α-phenylethyl]-phenols, polyethylene oxide tert.-dodecyl thioethers, polyamine polyglycol ethers or addition products of 15 or 30 mols of ethylene oxide with 1 mol of the amine $C_{12}H_{25}NH_2$ or $C_{18}H_{37}NH_2$.

Anionic dispersing agents which may be mentioned are: sulphuric acid esters of alcohols of the fatty series with 8 to 20 carbon atoms, of the ethylene oxide adducts of the corresponding fatty acid amides, or of alkylated phenols with 8 to 12 carbon atoms in the alkyl radical; sulphonic acid esters containing alkyl radicals with 8 to 20 carbon atoms; sulphation products of unsaturated fats and oils; phosphoric acid esters containing alkyl radicals with 8 to 20 carbon atoms; fatty acid soaps and also alkylarylsulphonates, condensation products of formaldehyde and naphthalenesulphonic acid and ligninsulphonates.

Suitable cationic dispersing agents are quaternary ammonium compounds which contain alkyl or aralkyl radicals with 8 to 20 carbon atoms.

In addition to the dispersing agents, the dyestuff formulations can also contain organic solvents, especially solvents which boil above 100° C. and which preferably are miscible with water, such as mono- and di-alkylglycol ethers, dioxane, dimethylformamide or dimethylacetamide, tetramethylenesulphone or dimethylsulphoxide. The dyestuff, the dispersing agent and the solvent can advantageously be ground together.

A dyestuff formulation of this type is manufactured, for example, by mixing 2 to 30, and preferably 5 to 20, percent by weight of the dispersing agent to a paste with 10 to 55 percent by weight, and preferably approximately the two-fold to four-fold amount, of the dyestuff and about 10 to 20 parts of a glycol or of another water-retaining agent. Subsequently, for example, the pH value is adjusted to about 9 with a dilute acid, preferably with sulphuric acid or acetic acid, and the mixture is then made up to 100% with water. The mixture is then ground to the necessary fineness, for example in a glass mill or another dispersing apparatus, and during this operation the grinding temperature can be between 20° and 90° C.

The dyeing of the polyester fibres with the dyestuffs according to the invention, which are sparingly soluble in water, from an aqueous dispersion is carried out by the processes customary for polyester materials. Polyesters of aromatic polycarboxylic acids with polyhydric alcohols are preferably dyed at temperatures of above 100° C. under pressure. However, dyeing can also be carried out at the boiling point of the dye bath in the presence of colour-transfer agents, for example phenylphenols, polychlorobenzene compounds or similar auxiliaries, or can be effected by the thermosol process, that is to say padding with subsequent hot after-treatment, for example thermofixing, at 180° to 210° C.

Cellulose 2½-acetate fibres are preferably dyed at temperatures of 80° to 85° C., whilst cellulose triacetate fibres are advantageously dyed at the boiling point of the dye bath. The use of colour-transfer agents can be dispensed with when dyeing cellulose 2½-acetate fibres or polyamide fibres. Dyestuffs according to the invention can also be used for printing the said materials by customary methods.

The dyeings obtained according to the present process can be subjected to an after-treatment, for example by heating with an aqueous solution of a non-ionic washing agent.

According to the present process it is also possible to apply the indicated compounds by printing, instead of by impregnating. For this purpose, for example, a printing ink which contains the finely dispersed dyestuffs in addition to the auxiliaries customary in printing, such as wetting agents and thickeners, is used.

Furthermore, for example, synthetic fibres, such as polyesters and polyamides, can be dyed in organic solvent liquors, such as in a mixture of perchloroethylene and dimethylformamide or in pure perchloroethylene.

Deep, luminous dyeings and prints with excellent fastness properties, especially fastness to light, thermofixing, sublimation, pleating, flue gas, cross-dyeing, dry-cleaning, ironing, rubbing, chlorine and wet processing, such as fastness to water, washing and perspiration, are obtained by the present process.

The new dyestuffs, which are insoluble in water, can also be used for spin-dyeing polyamides, polyesters and polyolefines. The polymer to be dyed is appropriately mixed, in the form of a powder, granules or chips, as a ready-to-use spinning solution or in the molten state with the dyestuff, which is introduced in the dry state or in the form of a dispersion or solution in an optionally volatile solvent. After homogeneous dispersion of the dyestuff in the solution or melt of the polymer, the mixture is processed in a known manner by casting, pressing or extruding to fibres, yarns, monofilaments, films and the like.

The dyestuffs according to the invention are outstandingly suitable for colouring oils or macromolecular materials, such as lacquers, films, sheets and mouldings, for example those made of cellulose esters, such as cellulose 2½-acetate and cellulose triacetate, polyvinyl compounds, such as polyvinyl chloride and polyvinyl acetate; polyurethanes, polystyrene, polyesters, polyamides and polycarbonates in bulk. The dyestuffs which can be used for this application are, in particular, the compounds of the formula I which are not in the form of a salt and also those which contain sulpho groups and are in the form of salts of suitable organic cations, such as, for example, those of alkylamines which solubilise fats or of basic dyestuffs.

The dyestuffs according to the invention possess high fastness to light, even in light dyeings and in combination with other disperse dyestuffs, high brilliance (fluorescence), high fastness to sublimation, a low sensitivity to carriers in respect of the fastness to light and a high depth of colour, coupled with a good reserve for other fibres, for example wool fibres. They also have only a low sensitivity to changes in pH and are especially suitable for the high temperature process and the thermosol process as well as for permanent press finishing ("Koratron" process). They are also suitable for printing by all customary processes, including, inter alia, for the printing of mixed fabrics.

They possess a high fastness to light, good stability to heat and good solubility, even in the case of bulk dyeings (especially polyester spinning compositions). Coupled with a high fastness to sublimation, they display no migration on the surface when the fibres are subjected to heat treatments (for example on texturing) and display good fastness to rubbing.

The sulphonated representatives of the dyestuffs according to the invention are in the main used for dyeing wool and synthetic polyamides and, for this purpose, aqueous solutions which contain textile auxiliaries, such as, for example, levelling agents, are used.

In the examples which follow, parts denote parts by weight, unless otherwise stated, percentages denote percentages by weight and the temperatures are given in degrees Centigrade.

Preparation of the starting materials (a) 15.6 parts by weight of o-xylylene dicyanide and 8.5 parts by weight of glyoxal hydrate (trimer) (3C$_2$H$_2$O$_2$.2H$_2$O) containing 80% of glyoxal to be liberated are stirred into 200 parts by volume of methanol.

11.2 parts by weight of powdered potassium hydroxide are added in portions to the reaction mixture, at 15°, whilst stirring and under nitrogen.

After the potassium hydroxide has been added, the reaction mixture is stirred for a further 15 hours at room temperature and under nitrogen. The slightly brown-coloured reaction mixture is then freed from methanol in vacuo and diluted with 500 parts by volume of water. The crude 1,4-dicyanonaphthalene which has precipitated is filtered off and washed with water until neutral. 11 parts by weight (61.8% of theory) of 1,4-dicyanonaphthalene are obtained in the form of slightly brown-coloured small needles with a melting point of 175° to 185° C.

After recrystallising once from alcohol with the aid of 5 parts by weight of active charcoal, 5.5 parts by weight of the compound

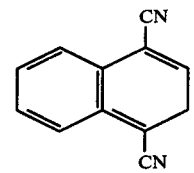

(101)

are obtained in the form of beautiful needles with a melting point of 204° to 205° C.

(b) 46.4 g of technical grade naphthalene-1,4-dicarboxylic acid (93% pure) are introduced at a temperature of 20° to 25° into a stirred flask which contains 480 g of 93% strength sulphuric acid, whilst stirring. The resulting thick suspension is cooled to 0° and a mixture consisting of 22 g of 63% strength nitric acid and 22 g of 93% strength sulphuric acid is allowed to run in dropwise in the course of 30 minutes at 0° to 2°, with external cooling. The mixture is then stirred for a further 5 hours at 0° to 5° and is then poured onto 1 kg of fine ice. The product which has precipitated is filtered off using a suction filter and is washed with water until neutral, after which the resulting product of the formula

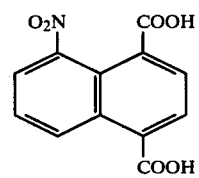

is dried in vacuo at 70°. Yield 45 g.

For purification, 45 g of the crude product are heated briefly to the boil with 225 ml of glacial acetic acid, the mixture is then allowed to cool and the product which has precipitated is filtered off at room temperature. This gives the nitro compound in the form of a pale grey powder which dissolves completely in water when sodium carbonate is added. Melting point 252°.

(c) 52 parts of 8-nitro-naphthalene-1,4-dicarboxylic acid are dissolved in 700 parts of absolute ethyl alcohol and the solution is boiled under reflux for 12 hours whilst continuously passing in hydrogen chloride gas. The resulting solution is evaporated in vacuo. The 4-ethoxycarbonyl-8-nitro-naphthalene-1-carboxylic acid of the formula

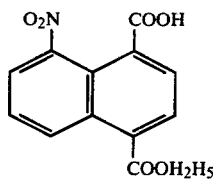

which is obtained in this way, melts at 178° to 180°.

If the monoester is hydrogenated, the 4-ethoxycarbonyl-1,8-naphtholactam described above is obtained and this confirms that the esterification of the carboxylic acid group has taken place in the 4-position.

(d) 130 parts of 8-nitro-naphthalene-1,4-dicarboxylic acid are dissolved in 500 parts of dimethylformamide, 40 parts of sodium hydroxide are added and after stirring for 30 minutes 170 parts by volume of diethyl sulphate are added all at once. The temperature then rises to 90°. The mixture is stirred for 2 hours, paying no attention to the temperature, a small amount of impurities is then filtered off from the solution and the filtrate is discharged into 2,500 parts by volume of a 10% strength sodium chloride solution and 50 parts by volume of a 30% strength sodium hydroxide solution. After stirring briefly, diethyl 8-nitro-naphthalene-1,4-dicarboxylate with a melting point of 107° to 109° is filtered off, washed and dried.

(e) 32 parts of diethyl 8-nitro-naphthalene-1,4-dicarboxylate are stirred into 200 parts of glacial acetic acid and, after adding 20 parts of iron powder, the mixture is boiled under reflux for 6 hours. For working up, the mixture is filtered hot, the filtrate is diluted with an equal volume of water and the 4-ethoxycarbonyl-1,8-naphtholactam which is thus precipitated is filtered off, washed until neutral and dried. The product of the formula

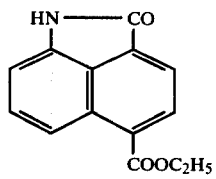

which is obtained in good yield, melts at 216° to 218°. Analysis gave the following values

|  | C | H | N |
| --- | --- | --- | --- |
| calculated: | 69.7 | 4.6 | 5.8 |
| found: | 69.3 | 4.5 | 5.6 |

(f) 29 parts of dimethyl 8-nitro-naphthalene-1,4-dicarboxylate (which can be prepared analogously to Example 5 using dimethyl sulphate) are dissolved in 500 parts of ethyl acetate and hydrogenated with Raney nickel. 4-Methoxy-carbonyl-8-amino-1-naphtholactam precipitates out virtually completely. After the hydrogenation has ended, the mixture is filtered and the residue is extracted with methylglycol. Evaporation of the extraction solution gives the ester of the formula

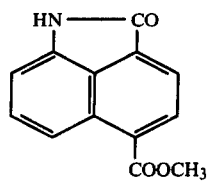

with a melting point of 264° to 266°. Analysis gave the following values:

hz,1/32

|  | C | H | N |
| --- | --- | --- | --- |
| calculated: | 68.72 | 3.99 | 6.17 |
| found: | 68.5 | 4.0 | 5.9 |

(g) 24 parts of 4-ethoxycarbonyl-8-amino-1-naphtholactam are boiled in 180 parts of water and 20 parts of a 30% strength sodium hydroxide solution for one hour under reflux, during which time everything goes into solution. This solution is filtered with charcoal whilst still hot and the filtrate is acidified. The 8-amino-1-naphtholactam-4-carboxylic acid which has precipitated is filtered off after cooling and washed with water and dried.

EXAMPLE 1

A mixture of 2.10 ml of phosphorus oxychloride and 3 ml of chlorobenzene is allowed to run dropwise into a mixture consisting of 4.80 g of the compound of the formula

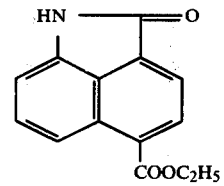

4.65 g of the compound of the formula

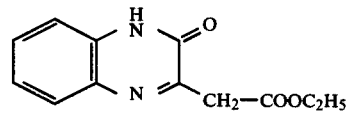

and 30 ml of chlorobenzene, at a temperature of 100°, and the resulting mixture is then stirred at the same temperature for a further 30 minutes. After cooling, the precipitate which has formed is isolated by filtration and washed with chlorobenzene. The material on the filter is now suspended in 50 ml of isopropanol and 50 ml of pyridine are added, the mixture is heated to a temperature of 65° to 70° and 60 ml of a 10% strength sodium bicarbonate solution are added, whereupon the mixture exhibits a pH value of about 8. The dyestuff of the formula

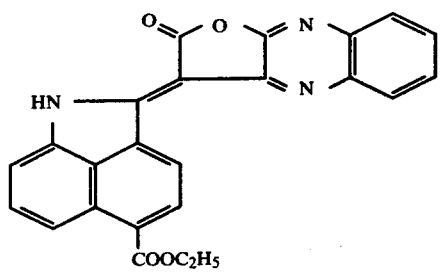

which has been liberated is filtered off at 55° and washed with isopropanol, after which it is dried at 70°.

When applied as a dispersion by the high temperature process, the dyestuff dyes fabric made of polyester brilliant red-violet. The dyeings possess good fastness properties and in particular good fastness to sublimation and light.

If, with an otherwise identical procedure, equivalent amounts of the naphtholactam compounds listed under I in the table which follows are used in place of the naphtholactam compound mentioned initially and equivalent amounts of the compounds listed under II, which contain an active methylene group, are used in place of the heterocyclic compound mentioned above, the dyestuffs listed under III, which dye polyester in brilliant fast colour shades are obtained.

Table

| No. | I Naphtholactam compound | II Compound containing an active methylene group | III Dyestuff | IV Shade on polyethylene terephthalate |
|---|---|---|---|---|
| 1 | | | | red violet |
| 2 | | " | | " |
| 3 | | " | | " |
| 4 | | " | | " |
| 5 | | | | violet |

Table-continued

| No. | I Naphtholactam compound | II Compound containing an active methylene group | III Dyestuff | IV Shade on polyethylene terephthalate |
|---|---|---|---|---|
| 6 | HN—C=O, decalin, COOCH$_2$—CH(CH$_3$)$_2$ | " | Condensed product with OCH$_3$-substituted pyrazine, COOCH$_2$—CH(CH$_3$)$_2$ | " |
| 7 | HN—C=O, decalin, COOC$_4$H$_9$-n | " | Condensed product with OCH$_3$, COOC$_4$H$_9$-n | " |
| 8 | HN—C=O, decalin, COOCH(CH$_3$)—C$_2$H$_5$ | " | Condensed product with OCH$_3$, COOCH(CH$_3$)—C$_2$H$_5$ | " |
| 9 | HN—C=O, decalin, COOCH(CH$_3$)$_2$-type (CH$_3$, CH$_3$) | " | Condensed product with OCH$_3$, COOCH(CH$_3$, CH$_3$) | " |
| 10 | " | H$_3$C—(decahydroquinoxalinone)—CH$_2$—COOC$_2$H$_5$ | Condensed product with CH$_3$ substituent, COOCH(CH$_3$, CH$_3$) | " |
| 11 | HN—C=O, decalin, COOC$_2$H$_5$ | " | Condensed product with CH$_3$, COOC$_2$H$_5$ | " |
| 12 | HN—C=O, decalin, COOCH$_2$—CH(CH$_3$)$_2$ | " | Condensed product with CH$_3$, COOCH$_2$—CH(CH$_3$)$_2$ | " |

Table-continued

| No. | I Naphtholactam compound | II Compound containing an active methylene group | III Dyestuff | IV Shade on polyethylene terephthalate |
|---|---|---|---|---|
| 13 | [structure: naphtholactam with COOC4H9—n] | [structure: H3C-substituted with CH2—COOC2H5] | [dye structure with CH3 and COOC4H9—n] | violet |
| 14 | [structure: naphtholactam with COOCH(CH3)C2H5] | " | [dye structure with CH3 and COOCH(CH3)C2H5] | " |
| 15 | " | [structure with O—CH2—CH2—OOC—CH3 and CH2—COOC2H5] | [dye structure with O—C2H4—OOC—CH3 and COOCH(CH3)C2H5] | " |
| 16 | [structure: naphtholactam with COOC4H9—n] | " | [dye structure with O—C2H4—OOC—CH3 and COOC4H9—n] | " |
| 17 | [structure: naphtholactam with COO—CH2—CH(CH3)CH3] | [structure with O—C2H4—OOC—CH3 and CH2—COOC2H5] | [dye structure with O—C2H4—OOC—CH3 and COO—CH2—CH(CH3)CH3] | " |
| 18 | [structure: naphtholactam with COO—CH(CH3)CH3] | " | [dye structure with O—C2H4—OOC—CH3 and COO—CH(CH3)CH3] | " |
| 19 | [structure: naphtholactam with COOC2H5] | " | [dye structure with O—C2H4—OOC—CH3 and COOC2H5] | " |

Table-continued

| No. | I Naphtholactam compound | II Compound containing an active methylene group | III Dyestuff | IV Shade on polyethylene terephthalate |
|---|---|---|---|---|
| 20 | [structure with HN, C=O, COOC₂H₅] | [structure with NH, C=O, N, CH₂—COOC₂H₅, O—C₂H₄—OC₂H₅] | [dyestuff structure with O—C₂H₄—OC₂H₅, COOC₂H₅] | " |
| 21 | [structure with HN, C=O, COOCH(CH₃)₂] | " | [dyestuff structure with O—C₂H₄—OC₂H₅, COOCH(CH₃)₂] | " |
| 22 | [structure with HN, C=O, COOC₄H₉—n] | " | [dyestuff structure with O—C₂H₄—OC₂H₅, COOC₄H₉—n] | " |
| 23 | [structure with HN, C=O, COOCH₂—CH(CH₃)₂] | " | [dyestuff structure with O—C₂H₄—OC₂H₅, COOCH₂—CH(CH₃)₂] | " |
| 24 | [structure with HN, C=O, COO—CH(CH₃)C₂H₅] | [structure with NH, C=O, N, CH₂—COOC₂H₅, O—C₂H₄—OC₂H₅] | [dyestuff structure with O—C₂H₄—OC₂H₅, COO—CH(CH₃)C₂H₅] | violet |
| 25 | [structure with N—CH₃, C=O, COOC₂H₅] | [structure with H₃CO, NH, C=O, N, CH₂—COOC₂H₅] | [dyestuff structure with N—CH₃, OCH₃, COOC₂H₅] | blue |
| 26 | [structure with N—CH₃, C=O, COO—CH(CH₃)₂] | " | [dyestuff structure with N—CH₃, OCH₃, COO—CH(CH₃)₂] | " |

Table-continued

| No. | I Naphtholactam compound | II Compound containing an active methylene group | III Dyestuff | IV Shade on polyethylene terephthalate |
|---|---|---|---|---|
| 27 | (structure with N-CH₃, COOC₄H₉—n) | " | (dyestuff structure with OCH₃, COOC₄H₉—n) | " |
| 28 | (structure with N-CH₃, COOCH₂—CH(CH₃)₂) | " | (dyestuff structure with OCH₃, COOCH₂—CH(CH₃)₂) | " |
| 29 | (structure with N-CH₃, COOCH(CH₃)—C₂H₅) | " | (dyestuff structure with OCH₃, COOCH(CH₃)—C₂H₅) | " |
| 30 | (structure with N-CH₃, COOCH(CH₃)—C₂H₅) | H₃C— (quinoxalinone with CH₂—COOC₂H₅) | (dyestuff structure with OCH₃, COOCH(CH₃)—C₂H₅) | " |
| 31 | (structure with N-CH₃, COOCH₂—CH(CH₃)₂) | " | (dyestuff structure with OCH₃, COOCH₂—CH(CH₃)₂) | " |
| 32 | (structure with N-CH₃, COOC₄H₉—N) | " | (dyestuff structure with OCH₃, COOC₄H₉—n) | " |

Table-continued

| No. | I Naphtholactam compound | II Compound containing an active methylene group | III Dyestuff | IV Shade on polyethylene terephthalate |
|---|---|---|---|---|
| 33 | N-CH₃ lactam with COOCH(CH₃)₂ | " | corresponding dyestuff with OCH₃ | " |
| 34 | N-CH₃ lactam with COOC₂H₅ | " | corresponding dyestuff with OCH₃ | " |
| 35 | N-C₂H₅ lactam with COOC₂H₅ | " | corresponding dyestuff with CH₃ | " |
| 36 | N-C₂H₅ lactam with COOCH(CH₃)₂ | H₃C— quinoxalinone —CH₂—COOC₂H₅ (with NH) | corresponding dyestuff with CH₃ | blue |
| 37 | N-C₂H₅ lactam with COOC₄H₉—n | " | corresponding dyestuff with CH₃ | " |
| 38 | N-C₂H₅ lactam with COOCH₂—CH(CH₃)₂ | " | corresponding dyestuff with CH₃ | " |
| 39 | N-C₂H₅ lactam with COOCH(C₂H₅)(CH₃) | " | corresponding dyestuff with CH₃ | " |

Table-continued

| No. | I Naphtholactam compound | II Compound containing an active methylene group | III Dyestuff | IV Shade on polyethylene terephthalate |
|---|---|---|---|---|
| 40 | N(C₂H₅), C=O, COOC₂H₅ | H₃CO-[quinoxalinone]-CH₂-COOC₂H₅ | [dyestuff structure with OCH₃, COOC₂H₅] | " |
| 41 | N(C₂H₅), C=O, COOCH(CH₃)₂ | " | [dyestuff with isopropyl ester, OCH₃] | " |
| 42 | N(C₂H₅), C=O, COOC₄H₉-n | " | [dyestuff with n-butyl ester, OCH₃] | " |
| 43 | N(C₂H₅), C=O, COOCH₂-CH(CH₃)₂ | " | [dyestuff with isobutyl ester, OCH₃] | " |
| 44 | N(C₂H₅), C=O, COOCH(C₂H₅)CH₃ | H₃CO-[quinoxalinone]-CH₂-COOC₂H₅ | [dyestuff with sec-butyl ester, OCH₃] | " |
| 45 | N(CH₃), C=O, CN | " | [dyestuff with CN, OCH₃, NCH₃] | " |
| 46 | N(C₂H₅), C=O, CN | " | [dyestuff with CN, OCH₃] | " |
| 47 | N(C₂H₅), C=O, CN | H₃C-[quinoxalinone]-CH₂-COOC₂H₅ | [dyestuff with CN, OCH₃] | " |

Table-continued

| No. | I Naphtholactam compound | II Compound containing an active methylene group | III Dyestuff | IV Shade on polyethylene terephthalate |
|---|---|---|---|---|
| 48 | 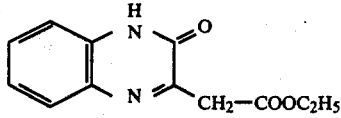 | " | 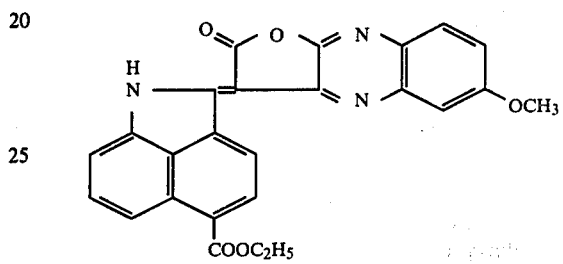 | " |

EXAMPLE 2

A mixture of 4.30 g of naphtholactam-5-carboxylic acid, 4.65 g of the compound of the formula

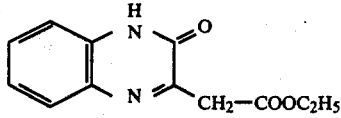

and 50 ml of chlorobenzene is stirred at 100° and a mixture of 6.30 ml of phosphorus oxychloride and 6 ml of chlorobenzene is allowed to run in dropwise in the course of about 30 minutes and the mixture is then stirred at the same temperature for a further two hours. After cooling, the precipitate of the product of the formula

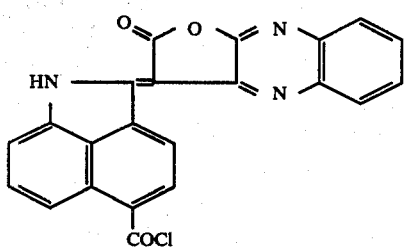

is filtered off and washed with chlorobenzene, after which strong suction is applied.

The dyestuff acid chloride is now suspended in 50 ml of absolute methyl alcohol and the mixture is heated under reflux for 4 hours. The dyestuff formed is isolated by filtration and washed with alcohol and then with water, after which it is dried at 100°. For purification, it is recrystallised from dimethylsulphoxide. The dyestuff thus obtained is identical with that prepared according to Example 1.

EXAMPLE 3

2 g of the dyestuff of the formula (mixture of two isomers, only one of which is shown)

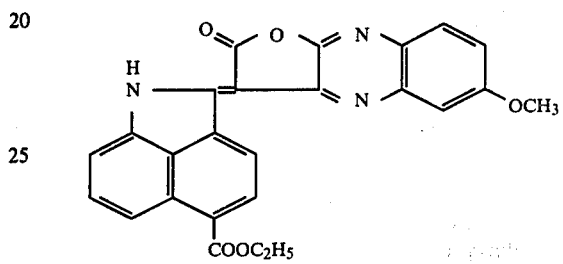

obtained according to Example 1, are dispersed in 4,000 g of water. 12 g of the sodium salt of o-phenylphenol, as a swelling agent, and 12 g of diammonium phosphate are added to this dispersion and 100 g of yarn made of polyethylene glycol terephthalate are dyed for 1½ hours at 95° to 98°. The dyeing is rinsed and after-treated with aqueous sodium hydroxide solution and a dispersing agent.

This gives a red-violet dyeing which is fast to washing, light and sublimation.

If, in the above example, the 100 g of polyethylene glycol terephthalate yarn are replaced by 100 g of cellulose triacetate fabric, the fabric is dyed under the indicated conditions and the dyeing is then rinsed with water, a red-voilet dyeing which has very good fastness to washing and sublimation is obtained.

EXAMPLE 4

Polyethylene glycol terephthalate fabric is impregnated, on a padder, at 40° with a liquor of the following composition: 20 g of the dyestuff obtained according to Example 1, finely dispersed in 7.5 g of sodium alginate, 20 g of triethanolamine, 20 g of octylphenol polyglycol ether and 900 g of water.

The fabric, which has been squeezed off to about 100%, is dried at 100° and then set for 30 seconds at a temperature of 210°. The dyed goods are rinsed with water, soaped and dried. A red-violet dyeing which is fast to washing, rubbing, light and sublimation is obtained under these conditions.

The dyestuffs described in the other examples give dyeings of equal quality by this process.

We Claim:

1. A dyestuff of the formula (I)

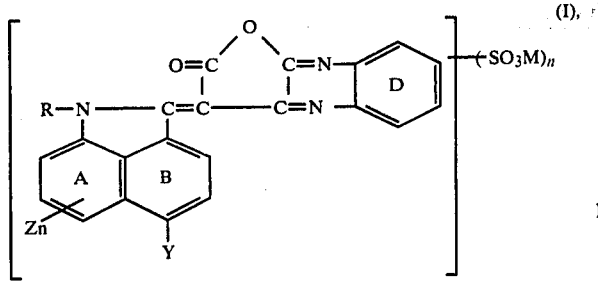

in which R represents $C_1$-$C_5$-alkyl, $C_1$-$C_5$-alkenyl, $C_5$-$C_6$-cycloalkyl, $C_6$-$C_9$-aralkyl, $C_6$-$C_9$-aryl or hydrogen, M represents hydrogen or a cation, Y represents —COOH, —CN, —COCl, —CONR$_1$R$_2$ or —COOR$_2$ wherein R$_1$ and R$_2$ are independently $C_1$-$C_{18}$ alkyl which is unsubstituted or substituted by $C_1$-$C_4$-alkoxy, hydroxy, chloro, bromo, cyano, carboxy $C_1$-$C_4$-alkoxy carbonyl, sulfo, carboxamido or acetoxy; cyclopentyl, methyl cyclohexyl, trimethylcyclohexyl or cyclohexyl; or phenyl, benzyl or phenethyl, which are unsubstituted or substituted by $C_1$-$C_4$-alkyl, $C_1$-$C_4$-alkoxy or halo; and R$_1$ also represents hydrogen, Z is $C_1$-$C_4$-alkoxy, Cl, Br, NO$_2$, $C_1$-$C_4$-alkyl-S-, cyano, CONH$_2$, and n represents 0, 1 or 2 and ring D is unsubstituted or substituted by $C_1$-$C_4$-alkyl, $C_1$-$C_4$-alkoxy, halo, cyano, carbo-$C_1$-$C_4$-alkoxy, cyclohexyl, phenyl-$C_1$-$C_3$-alkyl, phenyl, ethoxyethoxy or acetyloxyethoxy and if n represents O, D is also substituted by $C_1$-$C_4$-alkylsulphonyl, phenylsulphonyl and sulphonamido which is unsubstituted or substituted by 1 or 2 $C_1$-$C_4$-alkyl groups.

2. A dyestuff according to claim 1 which has the formula

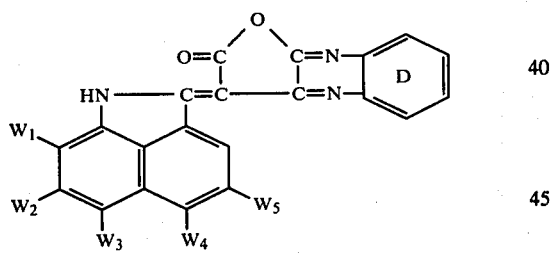

in which D has the same meaning as in claim 1 and W$_1$ denotes hydrogen, chlorine, bromine, $C_1$-$C_4$-alkoxy, nitro or $C_6$-$C_9$-arylmercapto, W$_2$ denotes hydrogen or chlorine, W$_3$ denotes hydrogen, chlorine, bromine, $C_1$-$C_5$-alkoxy, nitro, $C_1$-$C_4$-alkylmercapto, phenyl mercapto, SO$_2$NH$_2$, W$_4$ denotes —COOH, —CN, —COCl, —CONR$_1$R$_2$ or —COOR$_2$ wherein R$_1$ and R$_2$ are independently $C_1$-$C_{18}$-alkyl which is unsubstituted or substituted by $C_1$-$C_4$-alkoxy, hydroxy, chloro, bromo, cyano, carboxy, carbo-$C_1$-$C_4$-alkoxy, sulfo, carboxamido or acetoxy; cyclopentyl, methyl cyclohexyl, trimethylcyclohexyl, or cyclohexyl; or phenyl, benzyl or phenethyl, which are unsubstituted or substituted by $C_1$-$C_4$-alkyl, $C_1$-$C_4$-alkoxy or halo; and R$_1$ also represents hydrogen and W$_5$ denotes hydrogen, chlorine or $C_1$-$C_4$-alkoxy.

3. A dyestuff according to claim 1, wherein R is hydrogen, methyl or ethyl and n is zero.

4. A dyestuff according to claim 1 which is free from groups conferring solubility in water.

5. A dyestuff according to claim 2 wherein W$_1$, W$_2$ and W$_5$ are hydrogen and W$_3$ represents bromine or chlorine.

6. A dyestuff as claimed in claim 2 of the formula

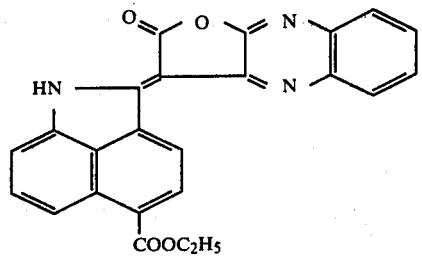

7. A dyestuff as claimed in claim 2 of the formula

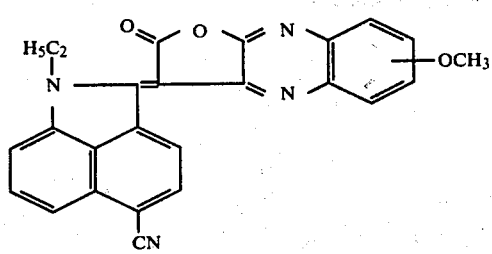

8. A dyestuff as claimed in claim 2 of the formula

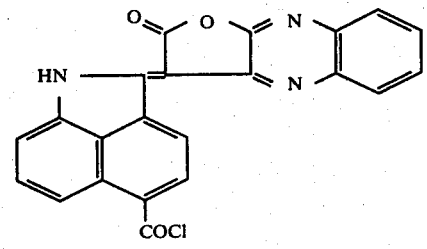

9. A dyestuff as claimed in claim 2 of the formula

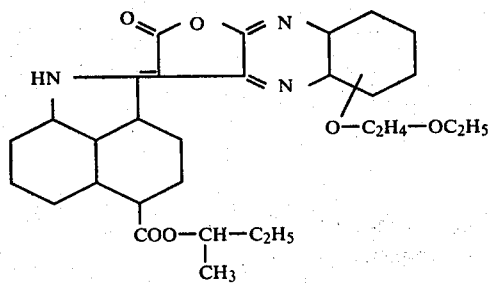

10. A dyestuff as claimed in claim 2 of the formula

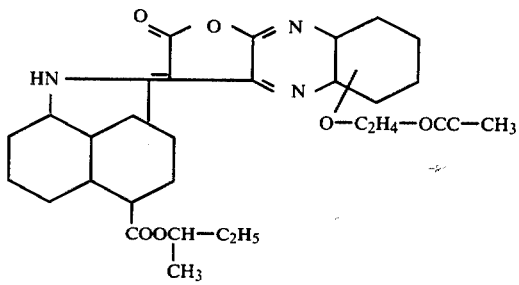
11. A dyestuff as claimed in claim 2 of the formula
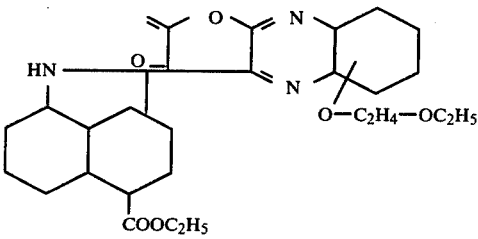
* * * * *

UNITED STATES PATENT AND TRADEMARK OFFICE
CERTIFICATE OF CORRECTION

PATENT NO. : 4,180,665
DATED : December 25, 1979
INVENTOR(S) : Hansrudolf Schwander, et al It is certified that error appears in the above-identified patent and that said Letters Patent are hereby corrected as shown below:

Column 9, line 1, "naphtholacetam" should be "naphtholactam".

Column 9, line 15, delete "," after "ethylene".

Column 12, line 64, "derivative" should be "derivatives".

Column 18, line 14, delete "hz, 1/32" above table.

Column 28, column III, formulas 30-34, "$OCH_3$" should be "$CH_3$".

Column 31, column I, formula 41, "$C_{25}$" should be "$C_2H_5$".

Column 32, column III, formula 47, "$OCH_3$" should be "$CH_3$".

Column 34, line 45, "voilet" should be "violet".

Signed and Sealed this

Twenty-fifth Day of March 1980

[SEAL]

Attest:

SIDNEY A. DIAMOND

Attesting Officer

Commissioner of Patents and Trademarks